(12) United States Patent
Eichorn (10) Patent No.: US 9,098,110 B2
(45) Date of Patent: Aug. 4, 2015

(54) HEAD ROTATION TRACKING FROM DEPTH-BASED CENTER OF MASS

(75) Inventor: David Mark Eichorn, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 838 days.

(21) Appl. No.: 13/212,745

(22) Filed: Aug. 18, 2011

(65) Prior Publication Data

US 2012/0308116 A1 Dec. 6, 2012

Related U.S. Application Data

(60) Provisional application No. 61/493,785, filed on Jun. 6, 2011.

(51) Int. Cl.
*G06F 3/01* (2006.01)
*G06K 9/00* (2006.01)

(52) U.S. Cl.
CPC ............ *G06F 3/012* (2013.01); *G06K 9/00335* (2013.01)

(58) Field of Classification Search
CPC ............... G06T 2207/30201; G06T 7/2046; G06T 2207/10012; G06T 2207/10016; G06T 7/2033; G06T 7/0044; G06T 17/00; G06T 2207/10021; G06T 7/0065; G06T 2207/10028; G06T 7/0046; G06T 7/0048; G06F 3/012; G06F 3/011; G06F 3/0346; G06F 3/017; G06F 3/04815; G02B 2027/0187; G06K 9/00228; G06K 9/00335; G06K 9/00369; G06K 9/00375; G06K 9/00221; G06K 9/00248; G06K 9/00355; G06K 9/3241; G06K 9/00201; G06K 9/00268; H04N 13/0239
USPC .......................................... 382/154, 100, 103
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Malassiotis, et al., "Robust Real-time 3D Head Pose Estimation from Range Data", Published on: Nov. 22, 2004, Available at: http://citeseerx.ist.psu.edu/viewdoc/download?doi=10.1.1.96.5359&rep=rep1&type=pdf.

(Continued)

*Primary Examiner* — Edward Park
(74) *Attorney, Agent, or Firm* — Aaron Chatterjee; Kate Drakos; Micky Minhas (57) ABSTRACT

The rotation of a user's head may be determined as a function of depth values from a depth image. In accordance with some embodiments, an area of pixels from a depth image containing a user's head is identified as a head region. The depth values for pixels in the head region are used to calculate a center of depth-mass for the user's head. The rotation of the user's head may be determined based on the center of depth-mass for the user's head.

20 Claims, 5 Drawing Sheets

(56) References Cited

U.S. PATENT DOCUMENTS

| | | |
|---|---|---|
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A * | 12/1999 | Kang ............................ 382/276 |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,332,038 B1 * | 12/2001 | Funayama et al. ............ 382/190 |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |

(56) References Cited

U.S. PATENT DOCUMENTS

| | | | |
|---|---|---|---|
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,825,948 | B2 | 11/2010 | Van Geest et al. |
| 7,834,846 | B1 | 11/2010 | Bell |
| 7,835,568 | B2 | 11/2010 | Park et al. |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2002/0075201 | A1 | 6/2002 | Sauer et al. |
| 2004/0105573 | A1 | 6/2004 | Neumann et al. |
| 2005/0196015 | A1* | 9/2005 | Luo et al. ............... 382/103 |
| 2006/0193494 | A1* | 8/2006 | Toyama ................ 382/103 |
| 2008/0026838 | A1 | 1/2008 | Dunstan et al. |
| 2009/0122146 | A1 | 5/2009 | Zalewski et al. |
| 2010/0128112 | A1 | 5/2010 | Marti et al. |
| 2010/0311512 | A1 | 12/2010 | Lock et al. |
| 2011/0080475 | A1 | 4/2011 | Lee et al. |

FOREIGN PATENT DOCUMENTS

| | | | |
|---|---|---|---|
| JP | 08044490 A1 | | 2/1996 |
| JP | 2006-527443 | | 11/2006 |
| KR | 10-2006-0068508 | | 6/2006 |
| WO | 93/10708 A1 | | 6/1993 |
| WO | 97/17598 A1 | | 5/1997 |
| WO | 99/44698 A1 | | 9/1999 |
| WO | WO 03-017680 | | 2/2003 |

OTHER PUBLICATIONS

Morency, Louis-Philippe, "Head Tracking and Gesture Recognition Library", Published on: Oct. 22, 2007, Available at: http://projects.ict.usc.edu/vision/watson/Watson24.pdf.

Vatahska, et al., "Feature-based Head Pose Estimation from Images", In Proceedings of 7th IEEE-RAS International Conference on Humanoid Robots, Nov. 29-Dec. 1, 2007, 6 pages.

TrackIR: head tracking view control immersion for flight racing and action simulator. http://www.natrualpoint.com/trackir/, Retrieval Date Aug. 3, 2011.

Freetrack, http://www.free-track.net/, Retrieval Date Aug. 3, 2011.

Jordan, Gran Turismo 5's "Head Tracking" Explained, Sep. 9, 2009. http://www.gtplanet.net/gran-turismo-5s-head-tracking-explained.

Salih Burak Gokturk and Carlo Tomasi, 3D Head Tracking Based on Recognition and Interpolation Using a Time-Of-Flight Depth Sensor, Jul. 19, 2004. http://citeseerx.ist.psu.edu/viewdoc/summary?doi=10.1.1.131.4125.

Ehsan Parvizi and Q.M. Jonathan Wu, Real-Time 3D Head Tracking Based on Time-of-Flight Depth Sensor, Oct. 29-31, 2007. http://ieeexplore.ieee.org/stamp/stamp.jsp?tp=&arnumber=4410329.

Harsh Nanda and Kikuo Fujimura, Visual Tracking Using Depth Data, Jun. 2-27, 2004. http://ieeexplore.ieee.org/stamp/stamp.jsp?arnumber=01384828.

Chenghua Xu, Yunhong Wand, Tieniu Tan and Long Quan, Depth vs. Intensity: Which is More Important for Face Recognition, Aug. 23-26, 2004. http://ieeexplore.ieee.org/xpls/abs_all.jsp?arnumber=1334122.

Filareti Tsalakanidou, Sotiris Malassiotis, and Michael G. Strintzis, Integration of 2D and 3D Images for Enhanced Face Authentication, 2004. http://vision.iti.gr/sotiris/publications/175_Tsalakanidou_F.pdf.

D. Colbry and G. Stockman, Real-time identification using a canonical face depth map, Jun. 2009. http://ieeexplore.ieee.org/stamp/stamp.jsp?arnumber=05069093.

Feng Xue and Xiaoqing Ding, 3D+2D Face Localization Using Boosting in Multi-Modal Feature Space, Sep. 18, 2006. http://ieeexplore.ieee.org/xpls/abs_all.jsp?tp=&arnumber=1699573.

International Search Report and Written Opinion us PCT/US2012/040774, mailed Feb. 7, 2013.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

(56) References Cited

OTHER PUBLICATIONS

Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
"Simulation and Training", 1994, Division Incorporated.
European Supplementary Search Report dated Sep. 26, 2014 in Application No. 12797098.6, 3 pages.
European Office Action dated Oct. 9, 2014 in Application No. 12797098.6, 7 pages.

* cited by examiner

HEAD ROTATION TRACKING FROM DEPTH-BASED CENTER OF MASS

CROSS-REFERENCE TO RELATED APPLICATIONS

This application claims the benefit of U.S. Provisional Application No. 61/493,785, filed Jun. 6, 2011, which is herein incorporated by reference in its entirety.

BACKGROUND

In many software applications, the orientation of the user's head can be used as an effective and natural form of input. For example, in 3D games, virtual reality environments, and visualizations, the orientation of the head can be used to control the orientation of the camera viewing the scene, giving the user more control over the experience, heightening immersion, and freeing the user's hands from controlling the camera by some other means, such as a joystick, mouse, or hat switch, for other tasks. This is popular, for example, among flight and driving simulator fans, enabling them to look around a virtual cockpit and quickly scan the environment.

In the past, these types of head orientation tracking systems have often taken one of two approaches. Some require the addition of specialized hardware to the user to enable tracking, such as reflectors or active infrared LEDs attached to the user's head or hat. This affects user comfort, requires preparation for the tracking experience, and requires either batteries or a cable to power the LEDs. Methods of tracking the user without hardware augmentation require far more complex and computationally expensive algorithms to process camera information and determine head orientation. When this information comes from an RGB (i.e., color) camera, as is the case with many current implementations, the quality of the results may be affected by lighting. Many of the algorithms described in academic literature on the topic require significant processing resources, and so would be impractical for many applications.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to determining a rotation of a user's head by using depth values from a depth image. An area of a depth image containing a user's head may be identified as a head region. Depth values from pixels in the head region may then be used to calculate a center of depth-mass that correlates with a rotation of the user's head. Accordingly, the rotation of the user's head may be determined based on the center of depth-mass calculated for the user's head.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to using the distance information from a depth camera and a lightweight computation metric to track the rotation of the user's head. The approach is capable of running in real time with minimal memory and CPU consumption. Additionally, the approach does not require the addition of any specialized hardware to the user's head, and also does not require use of an RGB camera. As such, embodiments of the present invention are useful in determining the rotation of the user's head for any of a variety of different applications. This may include, but is not limited to, using the rotation to control a camera viewpoint for a video game or other virtual environment.

In accordance with embodiments of the present invention, a depth image may be captured from an area in which a user is situated. As is known in the art, the depth image may comprise a number of pixels with a depth value for each pixel. The depth value for each pixel corresponds with a distance between a point on an object in the area being viewed by the depth camera and a reference position. An area containing the user's head within the depth image may be identified as a head region. The depth values for pixels within the head region may then be used to calculate a center of depth-mass for the user's head. The center of depth-mass may correspond with a center of mass of a solid of uniform density where the thickness of the mass is a function of the depth values of the pixels within the head region. Because this approach relies on the depth data from the depth image, this is referred to herein as the "center of depth-mass." Conceptually, depth may be viewed as a surrogate for density. In some embodiments, this may include setting a background depth value and determining the center of depth-mass for a solid that comprises the thickness of the user's head in the head region determined by the difference between depth values for pixels in the head region and the background depth value. The center of depth-mass in such embodiments then generally corresponds with a center of mass for the solid assuming a uniform density for the solid.

The center of depth-mass provides a good correlation for the rotation of the user's head. As such, the rotation of the user's head may be determined based on the center of depth-mass calculated from a depth image. In some embodiments, the rotation may be based on the difference between the position of the center of depth-mass and a position of the center of the user's head that may also be determined from the depth image.

Accordingly, in one aspect, an embodiment of the present invention is directed to one or more computer-storage media storing computer-useable instructions that, when used by one or more computing devices, cause the one or more computing devices to perform a method. The method includes receiving depth image data for a depth image, the depth image data including depth values for each of a plurality of pixels. The method also includes identifying a head region in the depth image, the head region corresponding with a user's head. The method further includes determining a background depth value. The method also includes calculating a center of depth-mass for the user's head as a function of depth values for pixels in the head region, the background depth value, and positions of pixels in the head region. The method further includes identifying a center of head position. The method still further includes determining a rotation of the user's head based on the center of depth-mass and the center of head position.

In another embodiment, an aspect of the invention is directed to a method for using a depth image to determine a rotation of a user's head. The method includes receiving depth image data corresponding with pixels for a head region within the depth image. The method also includes calculating a center of depth-mass for the user's head based on depth values of the pixels in the head region. The method further includes determining the rotation of the user's head based on the center of depth-mass.

A further embodiment of the invention is directed to a computing device comprising a processor configured to: receive depth values for a plurality of pixels in a depth image; analyze the depth values to identify a head region that includes a first subset of pixels that contain a user's head; determine a background depth value by analyzing depth values for the first subset of pixels; calculate a center of depth-mass as a function of depth values for a second subset of pixels in the head region that have depth values that do not exceed the background depth value, the center of depth-mass being calculated by computing a center of mass for a solid of uniform density determined from the depth values for the second subset of pixels and the background depth value; identify a position in the head region corresponding with a center of the user's head; and determine a rotation of the user's head based on the center of depth-mass and the position in the head region corresponding with the center of the user's head.

Figure 1:
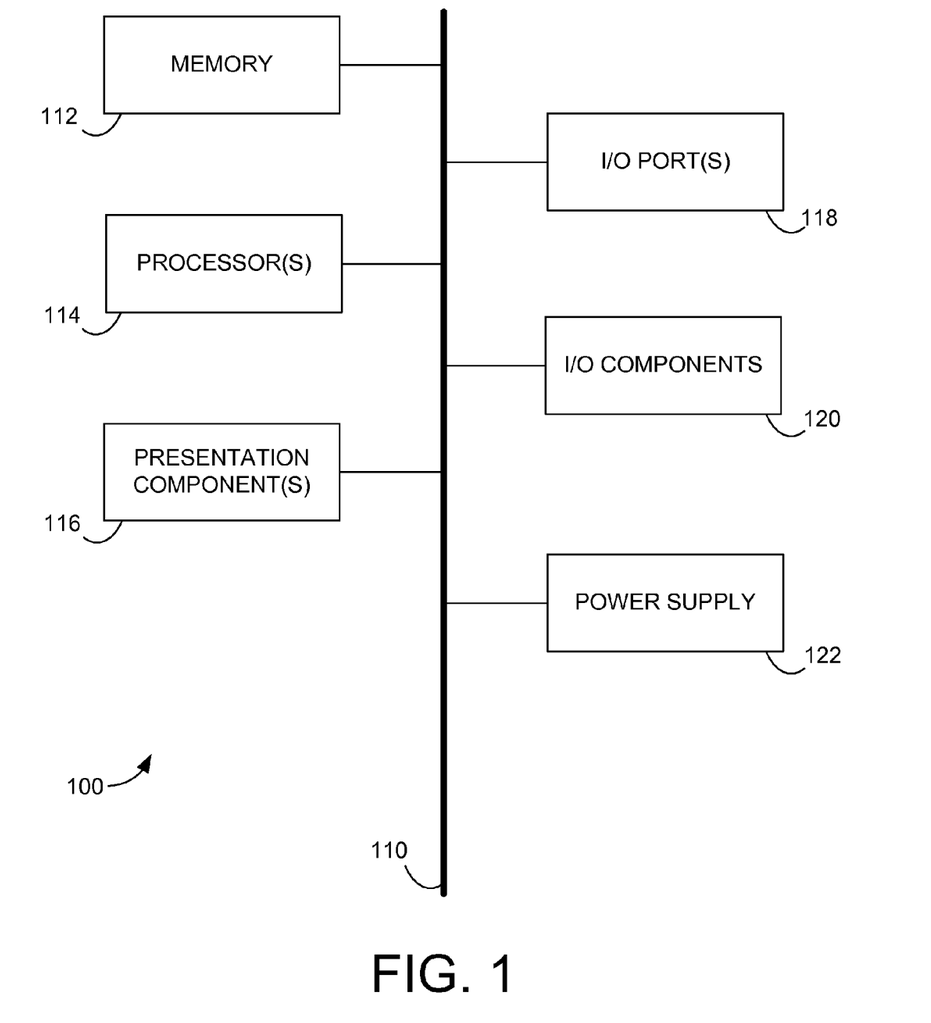
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
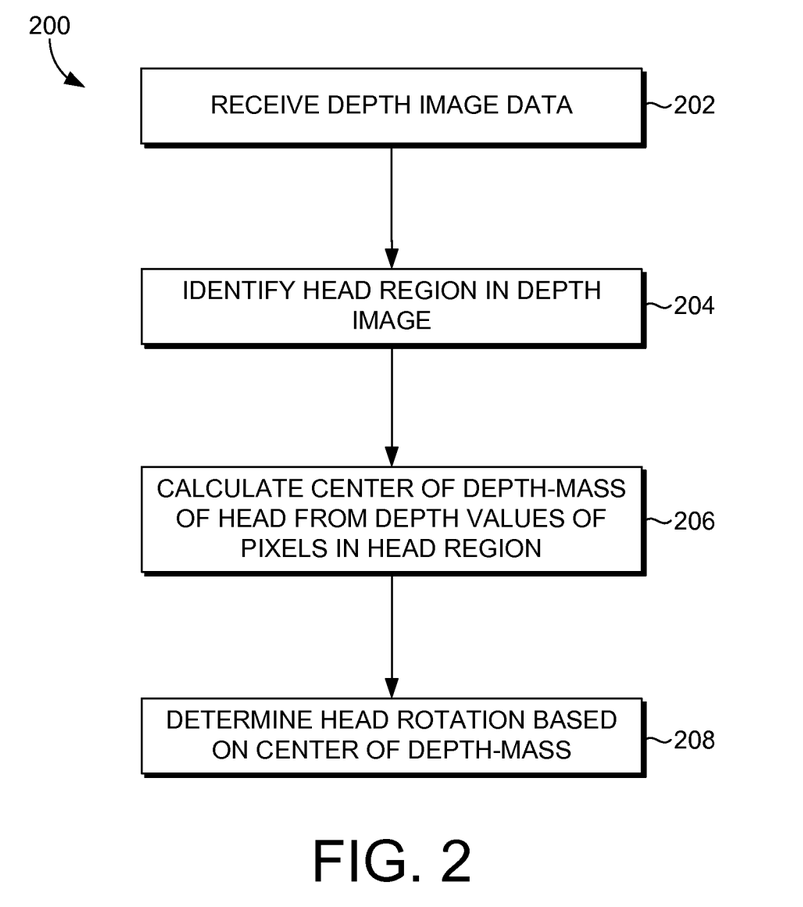
FIG. 2 is a flow diagram showing a method for determining a center of depth-mass for a user's head and using the center of depth-mass to determine the rotation of the user's head in accordance with an embodiment of the present invention.

Referring now to FIG. 2, a flow diagram is provided that illustrates a method 200 for determining a center of depth-mass for a user's head and using the center of depth-mass to determine the rotation of the user's head in accordance with an embodiment of the present invention. As shown at block 202, depth image data is initially received. This may be depth image data for a single depth image frame. The depth image may be captured using known depth camera techniques. As is known in the art, the depth image data may comprise depth values for each of a number of pixels within the depth image. The depth value for a given pixel corresponds with a distance between a point on a object being imaged and a reference position.

Figure 3A:
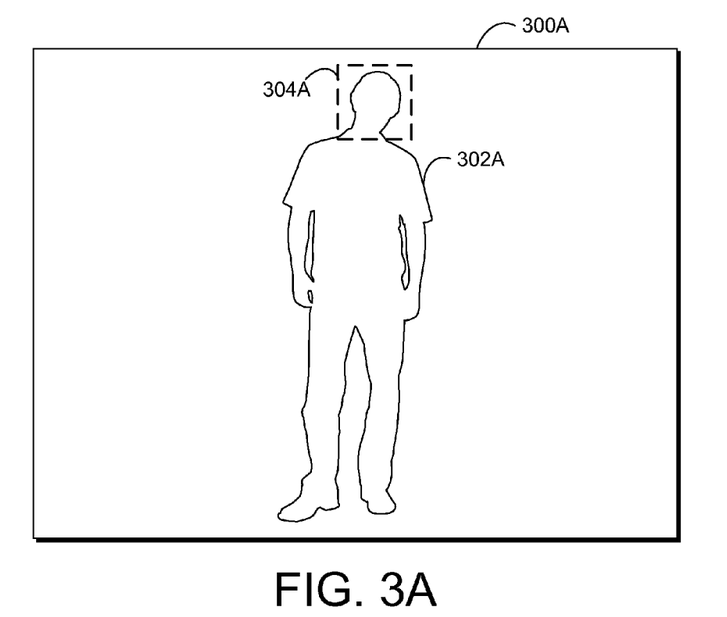
FIGS. 3A and 3B represent depth images with head regions identified around a user's head in accordance with an embodiment of the present invention.
Figure 3B:
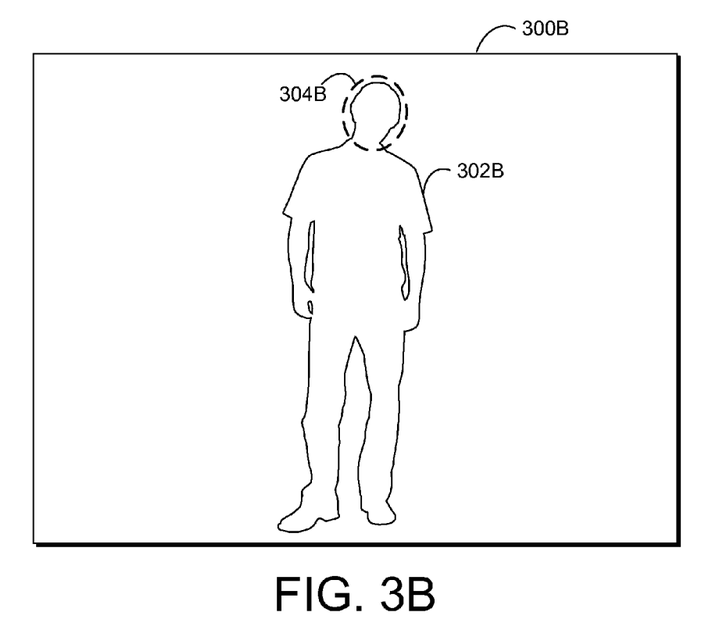

An area around a user's head is identified within the depth image as a head region, as shown at block 204. As used herein, a head region is an extent of pixels within a depth image that has been identified as including a user's head. The head region may contain the extent of the user's head or a sub-region of the user's head. Additionally, the head region may be any shaped or sized area of a depth image in accordance with embodiments of the present invention. This is illustrated by way of examples in FIGS. 3A and 3B. For instance, FIG. 3A shows a depth image 300A that includes a user 302A, in which a rectangular area around the user's head has been identified as a head region 304A. FIG. 3B shows a depth image 300B that includes a user 302B, in which a circular area around the user's head has been identified as a head region 304B. It should be understood that the depth images 300A and 300B have been simplified for purposes of illustration herein, and in practice, the depth images are likely more complex, capturing areas with multiple objects of varying depth. Additionally, although FIGS. 3A and 3B illustrate depth images 300A and 300B that include a user's entire body, it should be understood that depth images may only capture a portion of a user's body (e.g., from the user's waist up to the user's head).

A head region may be identified within a depth image in a number of different ways in accordance with various embodiments of the present invention. In some embodiments, the system may analyze the depth image to automatically identify the head region. This may include identifying a silhouette of an object in the depth image that generally corresponds with the size and shape of a human head. This approach is relatively computationally lightweight. As an example of this approach, in one embodiment, objects may generally be identified within a depth image by finding areas of pixels with similar depth and having edges created by areas of pixels with different depth. A number of different objects may be identified in the depth image. As such, the different objects may be each analyzed to determine which most closely corresponds with the size and shape of a human head. This may include first finding an object with a silhouette that closely corresponds with the size and shape of a human body and then finding a portion of the object that corresponds with the size and shape of a human head.

In other embodiments, the head region may be manually set by a user. For instance, a user interface (UI) may be provided that allows the user to specify the head position. The UI may include a real-time image of the user and allow the user to move the boundary of a displayed head region around the user's head (e.g., by moving the left, right, top, and bottom sides of a bounding box). This approach may be particularly applicable in situations in which the user is not likely to move about such that the user's head remains in the same area, such as when the user is seated in a fixed chair. By allowing the user to manually set the head region, a process of analyzing a depth image to identify a head region, such as that described above, may be bypassed.

In still further embodiments, the head region may be a fixed region set by the system, and the user may be instructed to position the user's head in an area corresponding with the head region. For instance, a UI may be provided that shows a view of the user's head and a box corresponding with the head region. The user would then be instructed to position himself/herself such that the user's head in the UI is located in the box shown in the UI.

Referring again to FIG. 2, a center of depth-mass is calculated for the user's head based on the depth values of pixels in the head region, as shown at block 206. As indicated previously, a center of depth-mass may generally refer to a center of mass determined for a solid of uniform density based on depth values from pixels in the head region of the depth image. The center of depth-mass may be based on a volume corresponding with the user's head or a volume corresponding with the area between the user's head and the reference position used to generate depth values (i.e., the center of depth-mass for the user's head would be directly proportional to the former volume, while the center of depth-mass for the user's head would be indirectly proportional to the latter volume). Generally, an algorithm may be employed to calculate a center of depth-mass for the user's head as a function of the depth value of each pixel (i.e., the distance from the object to the reference position as determined by the depth camera that captured the depth image) and the X-position (i.e., horizontal position) of each pixel. This may include all pixels in the head region or a portion thereof. In some embodiments, weighting may be applied as a function of the X-position of each pixel such that pixels near the edges are weighted less. This may help account for noise near the edges.

Figure 4:
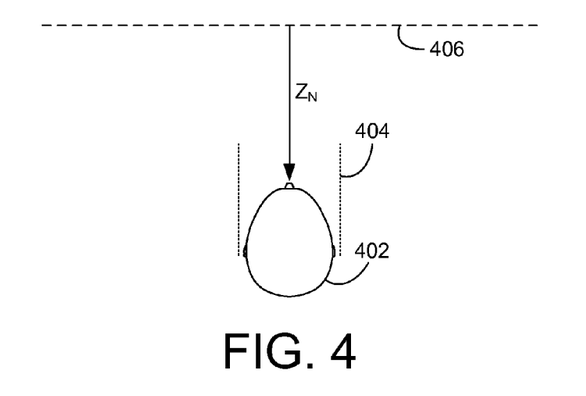
FIG. 4 is a plan view showing the top of a user's head and a distance to a point on the user's head from a given reference position that corresponds with a depth value for a pixel.
Figure 5A:
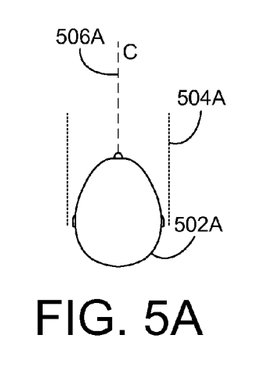
FIGS. 5A-5C are plan views showing the top of a user's head with the center of depth-mass shifting to the left or right as the user's head rotates to the left or right.
Figure 5B:
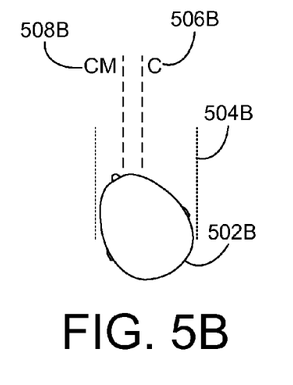

Conceptually, this is illustrated in FIGS. 4 and 5A-5B. In particular, FIG. 4 illustrates a plan view showing the top of a user's head 402 and an area 404 imaged as the head region in a depth image. Each pixel in the depth image has a depth value that represents the distance $Z_N$ of a point on an object relative to some reference position 406.

Figure 5C:
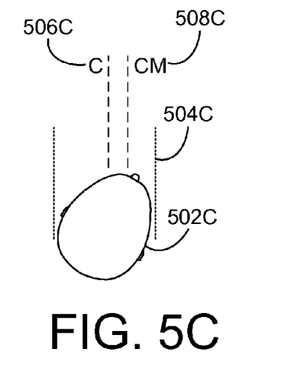

As can be understood from FIG. 5A, when the user is looking forward, the depth values on each side of a center point 506A in the head region 504A will be approximately the same, such that the center of depth-mass (not shown in FIG. 5A) would be calculated to be near the center point 506A. However, if the user were to rotate the user's head 502B to the user's left, as shown in FIG. 5B, more of the user's head 502B within the area corresponding with the head region 504B would shift to the user's left and the center of mass of the user's head would also shift to the user's left. This would be reflected in the depth image in that the distance to the user's head 502B would be collectively shorter on the left side than compared to the right side. As a result, the center of depth-mass 508B would be calculated based on such depth values to be located to the user's left of the center point 506B. As shown in FIG. 5B, the center of depth-mass 508B corresponds with a position along the X-direction. Alternatively, if the user were to rotate the user's head 502C to the user's right, as shown in FIG. 5C, more of the user's head 502C within the area corresponding with the head region 504C would shift to the user's right and the center of mass of the user's head would also shift to the user's right. This would be reflected in the depth image in that the distance to the user's head 502C would be collectively shorter on the right side than compared to the left side. As a result, the center of depth-mass 508C would be calculated based on such depth values to be located to the user's right of the center point 506C.

Turning back to FIG. 2 again, based on the center of depth-mass that was calculated at block 206, the rotation of the user's head is determined, as shown at block 208. For instance, as is represented in FIG. 5B, the position of the center of depth-mass 508B along the X-direction may indicate an extent to which the user's head 502B has rotated to the user's left. Likewise, as is represented in FIG. 5C, the position of the center of depth-mass 508C along the X-direction may indicate an extent to which the user's head 502C has rotated to the right. In some embodiments, the rotation of the user's head may be determined by comparing the center of depth-mass of the user's head to a center position. For instance, this may include the position of the center of depth-mass 508B in FIG. 5B with the center position 506B.

The rotation of the user's head determined at block 208 may be employed in any of a variety of different applications. By way of example only and not limitation, in some embodiments, the rotation of the user's head may be used to control the rotation of a camera viewpoint in a game or other virtual world.

Figure 6:
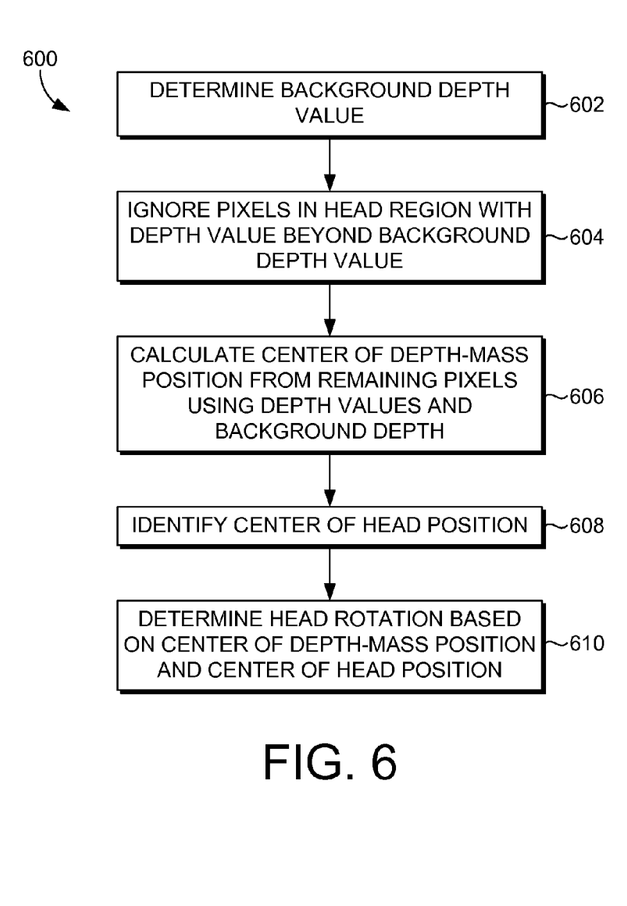
FIG. 6 is a flow diagram showing a method for using a background depth value to determine a center of depth-mass for a user's head and the rotation of the user's head in accordance with an embodiment of the present invention.

In some embodiments, the center of depth-mass for a user's head may be determined using a background depth as a reference point to calculate the depth or thickness of the user's head at each pixel relative to the background depth. This approach is described with reference to the method 600 of FIG. 6 and conceptually illustrated in FIG. 7. As shown in FIG. 6, a background depth value is determined at block 602. This may be done, for instance, after identifying a head region in a depth image (e.g., as discussed above with reference to block 204 of FIG. 2).

The background depth value may be determined in a variety of ways within the scope of embodiments of the present invention. In some embodiments, the maximum depth value from the pixels within the head region may simply be set as the background depth value. In other embodiments, the background depth value may be a function of an average depth value calculated from the depth value of pixels in the head region. For instance, an average depth value for all pixels in the head region may be calculated and a certain amount of depth (e.g., 10-20 cm) may be added beyond that average depth value to generate the background depth value. In some instances, the average value may be calculated from only a portion of the pixels in the head region, such as pixels in an area near the center of the head region. In still further embodiments, the background depth value may be manually set by a user. For instance, a manual approach for setting the background depth value may be employed when a user manually sets a head region as discussed hereinabove. Generally, a UI may be provided that allows the user to not only move and set a bounding area for the head region but also set the background depth value. Again, this approach may be more applicable to circumstances in which the user is not likely to move about such that the user's head generally remains in the same spot.

As shown at block 604, pixels in the head region with depth values that are greater than the background depth value may be ignored. As such, only pixels with depth values that are less than the background depth value would then be considered for further processing. In essence, the portion of the head region with depth values greater than the background depth value may be clipped and discarded from further processing.

Figure 7:
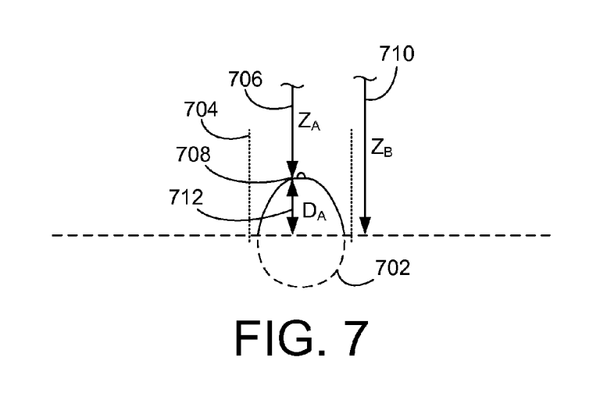
FIG. 7 is a plan view illustrating a depth of a user's head for a given point as determined based on the depth value of a pixel corresponding with that point and a background depth value.

Using the depth values for the remaining pixels, the background depth value, and the X-position (i.e., horizontal position) of the remaining pixels, the center of depth-mass for the user's head is calculated, as shown at block 606. In accordance with some embodiments, this may include determining a depth (i.e., thickness) of the user's head at each pixel based on the difference between the depth value for each pixel and the background depth value. This is illustrated conceptually in FIG. 7. In particular, FIG. 7 illustrates a plan view showing the top of a user's head 702 and an area 704 corresponding with the head region in a depth image. The depth value for a pixel A would correspond with a distance $Z_A$ 706 from a reference position (not shown) to a point 708 on the user's head 702, and the background depth value would correspond with a distance $Z_B$ 710 from the reference position. The difference in the distances $Z_A$ 706 and $Z_B$ 710 would correspond with a depth (i.e., thickness) of the user's head $D_A$ 712 at the point 708.

Accordingly, in some embodiments, the center of depth-mass may be determined by calculating the depth (i.e., thickness) of the user's head at each pixel based on the difference between the depth value for each pixel and the background depth value. The depth of the user's head at each pixel may be multiplied by the X-position of each pixel and those values may be summed and the summed value divided by the sum of the depth of the user's head for each pixel to calculate the center of depth-mass for the user's head. This approach may be represented in the following equation:

$$CDM = \frac{\sum XiDi}{\sum Di}$$

Wherein CDM represents the center of depth-mass; $X_i$ is the X-position of pixel i; and $D_i$ is the depth of the user's head at pixel i. As noted above, the depth of the user's head at a given pixel (i.e., $D_i$) is the difference between the depth value for the pixel (i.e., the distance from a reference point to a point on the object being imaged) and a background depth value. In this manner, the center of depth-mass is analogous to a center of mass of a solid of uniform density, in which the solid corresponds with the thickness of the user's head corresponding with the depth values and background depth value. In some embodiments, weighting may be applied as a function of the X-position of each pixel such that pixels near the edges are weighted less. This may help account for noise near the edges.

Referring again to FIG. 6, in addition to determining the center of depth-mass, a center position for the user's head may also be determined as shown at block 608. In some embodiments, this may simply be the center of the head region. In other embodiments, this may be the center of the silhouette of the user's head, which may be considered to correspond with the pixels remaining after clipping pixels with depth values beyond the background depth value at block 604. In some embodiments, an equation similar to that described above for the center of depth-mass may be used to determine the center of head position by simply using the same value (e.g., a value of 1) for the depth of the user's head for all pixels being considered.

As shown at block 610, a rotation of the user's head is determined by comparing the center of depth-mass determined at block 606 and the center of head position determined at block 608. As noted previously, the rotation of the user's head may be employed in any of a variety of different applications. By way of example only and not limitation, in some embodiments, the rotation of the user's head may be used to control the rotation of a camera viewpoint in a game or other virtual world.

In some embodiments, if the user is wearing something on the user's head (e.g., a hat with a forward brim or some sort of helmet with the proper shape), this can improve tracking by providing more depth-mass that shifts left/right with rotation and normalizing head shape. This could be employed, for instance, in some situations if a user's head is not tracked well, or to ensure consistent experience. By way of specific example to illustrate, this approach could be employed in a situation such as a simulation game at an amusement park where the users wear a helmet, and since all users wear the same helmet, crazy-shaped hair or other significant shape/size differences between users won't cause a problem for the system.

Although embodiments have been described herein in which a center of depth-mass has been determined in an X-direction (i.e., horizontal direction) to determine the rotation of a user's head in the horizontal plane, it should be understood that some embodiments may employ similar approaches to determine a center of depth-mass in a Y-direction (i.e., vertical direction) to determine the rotation of the user's head in the vertical plane. Additionally, the process described herein to determine the rotation of a user's head may be continuously repeated for different frames of depth images to track the rotation of the user's head over time. Any and all such variations and combinations thereof are contemplated to be within the scope of embodiments of the present invention.

As can be understood, embodiments of the present invention provide for determining a rotation of a user's head based on a center of depth-mass calculated from a depth image. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for using a depth image to determine a rotation of a user's head, the method comprising:
   receiving depth image data the depth image data including depth values for a plurality of pixels;
   determining a background depth value;
   identifying from the depth image data a head region within the depth image;
   identifying a subset of pixels in the head region that have a depth value that does not exceed the background depth value;
   calculating a center of depth-mass for the user's head based on depth values of the subset of pixels in the head region, wherein calculating the center of depth-mass comprises computing a center of mass for a solid of uniform density determined from the depth values for the subset of pixels and the background depth value; and
   determining the rotation of the user's head based on the location of the center of depth-mass.

2. The method of claim 1, further comprising:
   determining the head region by finding an object with a silhouette that closely corresponds with the size and shape of a human body; and
   determining a portion of the object that corresponds with the size and shape of a human head.

3. The method of claim 2, wherein the image is captured using a camera other than a red blue green camera.

4. The method of claim 1, wherein determining the rotation of the user's head based on the center of depth-mass comprises:
   approximating a position in the head region corresponding with a center of the user's head; and
   determining the rotation of the user's head based on a difference between the center of depth-mass and the position in the head region corresponding with the center of the user's head.

5. The method of claim 1, wherein the method further comprises using the rotation of the user's head to control a camera viewpoint for a virtual environment.

6. A computing device comprising:
   a processor configured to:
   receive depth values for a plurality of pixels in a depth image;
   determine a background depth value;
   identify from the depth image data a head region within the depth image;
   identify a subset of pixels in the head region that have a depth value that does not exceed the background depth value;
   calculate a center of depth-mass for the user's head based on depth values of the subset of pixels in the head region, wherein calculating the center of depth-mass comprises computing a center of mass for a solid of uniform density determined from the depth values for the subset of pixels and the background depth value; and
   determine the rotation of the user's head based on the location of the center of depth-mass.

7. The computing device of claim 6, wherein the device is configured to determine the background depth value by:
   identifying a maximum depth value from pixels within the head region; and
   setting the background depth value as a function of the maximum depth value.

8. The computing device of claim 6, wherein the device is configured to determine the background depth value by:
   calculating an average depth value based on depth values for at least a portion of pixels in the head region; and
   setting the background depth value as a function of the average depth value.

9. The computing device of claim 6, wherein the device is configured to identify the head region by:
   identifying objects in the depth image based on depth values; and analyzing the objects to identify a first object having a silhouette that corresponds with the size and shape of a human head.

10. The computing device of claim 6, wherein the device is configured to identify the head region by:
providing a user interface that allows the user to view an image of the user's head and to control a location of a boundary for the head region; and
receiving user input setting the location of the boundary for the head region.

11. The computing device of claim 6, wherein the device is configured to identify the head region by:
finding an object with a silhouette that closely corresponds with the size and shape of a human body; and
determining a portion of the object that corresponds with the size and shape of a human head.

12. The computing device of claim 6, wherein the device is configured to determine the rotation of the user's head based on the center of depth-mass by:
approximating a position in the head region corresponding with a center of the user's head; and
determining the rotation of the user's head based on a difference between the center of depth-mass and the position in the head region corresponding with the center of the user's head.

13. The computing device of claim 6, wherein the rotation of the user's head is used to control a camera viewpoint for a virtual environment.

14. The computing device of claim 6, wherein the device is configured to determine a depth of the user's head at each pixel based on the difference between the depth value for each pixel and the background depth value.

15. The computing device of claim 6, wherein the image is captured using a camera other than a red blue green camera.

16. The computing device of claim 6, wherein the image is captured using an infrared camera.

17. One or more computer-storage devices storing computer-useable instructions that, when used by one or more computing devices, cause the one or more computing devices to perform a method, the method comprising:
receiving depth image data the depth image data including depth values for a plurality of pixels;
determining a background depth value;
identifying from the depth image data a head region within the depth image;
identifying a subset of pixels in the head region that have a depth value that does not exceed the background depth value;
calculating a center of depth-mass for the user's head based on depth values of the subset of pixels in the head region, wherein calculating the center of depth-mass comprises computing a center of mass for a solid of uniform density determined from the depth values for the subset of pixels and the background depth value; and
determining the rotation of the user's head based on the location of the center of depth-mass.

18. The one or more computer storage devices of claim 17, wherein the center of depth-mass for the user's head is calculated using pixels in the head region with a depth value that does not exceed the background depth value.

19. The one or more computer storage devices of claim 17, wherein calculating the center of depth-mass for the user's head comprises:
identifying a group of pixels from the head region;
determining a thickness of the user's head for each pixel from the group of pixels based on a difference between the depth value for each pixel from the group of pixels and the background depth value;
calculating a first value by summing results from multiplying the thickness of the user's head for each pixel from the group of pixels by a position for each pixel from the group of pixels;
calculating a second value by summing the depth values for pixels in the group of pixels; and
calculating the center of depth-mass for the user's head by dividing the first value by the second value.

20. The one or more computer storage devices of claim 17, wherein calculating the center of depth-mass for the user's head comprises applying weighting as a function of pixel position within the head region.

* * * * *